US008397062B2

(12) United States Patent
Roy-Chowdhury et al.

(10) Patent No.: US 8,397,062 B2
(45) Date of Patent: Mar. 12, 2013

(54) METHOD AND SYSTEM FOR SOURCE AUTHENTICATION IN GROUP COMMUNICATIONS

(75) Inventors: Ayan Roy-Chowdhury, Silver Spring, MD (US); John S. Baras, Potomac, MD (US)

(73) Assignee: University of Maryland, College Park, College Park, MD (US)

( * ) Notice: Subject to any disclaimer, the term of this patent is extended or adjusted under 35 U.S.C. 154(b) by 217 days.

(21) Appl. No.: 12/764,266

(22) Filed: Apr. 21, 2010

(65) Prior Publication Data

US 2010/0268943 A1 Oct. 21, 2010

Related U.S. Application Data

(60) Provisional application No. 61/171,216, filed on Apr. 21, 2009.

(51) Int. Cl.
*H04L 29/06* (2006.01)
*H04L 9/32* (2006.01)
*G06F 7/04* (2006.01)
*G06F 15/16* (2006.01)
*G06F 17/30* (2006.01)

(52) U.S. Cl. .................. 713/157; 713/175; 726/10
(58) Field of Classification Search .............. 726/10; 713/156–157, 175
See application file for complete search history.

(56) References Cited

U.S. PATENT DOCUMENTS

| 7,181,614 | B1 * | 2/2007 | Gehrmann et al. ........... 713/155 |
| 7,356,329 | B2 * | 4/2008 | Willey et al. ................. 455/410 |
| 7,716,480 | B2 * | 5/2010 | Ghosh .......................... 713/170 |
| 7,760,885 | B2 * | 7/2010 | Park ............................. 380/283 |
| 7,783,043 | B1 * | 8/2010 | Dondeti ....................... 380/278 |
| 7,934,095 | B2 * | 4/2011 | Laberteaux et al. ......... 713/169 |
| 8,102,814 | B2 * | 1/2012 | Rahman et al. .............. 370/331 |
| 2004/0015689 | A1 * | 1/2004 | Billhartz ....................... 713/156 |
| 2004/0228492 | A1 * | 11/2004 | Park .............................. 380/277 |
| 2006/0005007 | A1 * | 1/2006 | Sharma ......................... 713/153 |
| 2006/0149965 | A1 * | 7/2006 | Sharma ......................... 713/163 |
| 2006/0282675 | A1 * | 12/2006 | Yao .............................. 713/176 |
| 2007/0014411 | A1 * | 1/2007 | Ghosh .......................... 380/277 |
| 2007/0214357 | A1 * | 9/2007 | Baldus et al. ................ 713/157 |
| 2007/0223702 | A1 * | 9/2007 | Tengler et al. ............... 380/270 |
| 2008/0046732 | A1 * | 2/2008 | Fu et al. ....................... 713/171 |
| 2008/0235509 | A1 * | 9/2008 | Laberteaux et al. ......... 713/156 |
| 2008/0307068 | A1 * | 12/2008 | Willey et al. ................. 709/218 |

OTHER PUBLICATIONS

Ayan Roy-Chowdhury & John S. Baras, A Lightweight Certificate-based Source Authentication Protocol for Group Communication in Hybrid Wireless/Satellite Networks. Nov. 30-Dec. 4, 2008. IEEE. p. 1-6.*
Ayan Roy-Chowdhury. Improving Network Performance, Security and Robustness in Hybrid Wireless Networks Using a Satellite Overlay. Nov. 24, 2008. University of Maryland. p. 1-221.*
A. Perrig and R. Canetti and D. Song and J. D. Tygar. Efficient and secure source authentication for multicast. Proc. Network and Distributed System Security Symposium (NDSS), 2001.

(Continued)

*Primary Examiner* — Christian Laforgia
(74) *Attorney, Agent, or Firm* — Sughrue Mion, PLLC

(57) ABSTRACT

A method and system for authentication is provided. A central node for issuing certificates to a plurality of nodes associated with the central node in a network is also provided. The central node receives a first key from at least one node from among the plurality of nodes and generates a second key based on the received first key and generates a certificate for the at least one node. The generated certificate is transmitted to the at least one node.

20 Claims, 8 Drawing Sheets

OTHER PUBLICATIONS

M. Bohge and W. Trappe. An Authentication Framework for Hierarchical Ad Hoc Sensor Networks. Proceedings of the 2003 ACM Workshop on Wireless Security (WiSE'03), pp. 79-87, San Diego, USA, 2003. ACM.

A. Perrig and R. Canetti and D. Song and J. D. Tygar. The TESLA Broadcast Authentication Protocol. RSA Cryptobytes, 2002.

M. Bohge and W. Trappe. TESLA certificates: an authentication tool for networks of compute-constrained devices. Proc. of 6th international symposium on wireless personal multimedia communications (WPMC '03), Yokosuka, Kanagawa, Japan, 2003.

A. Roy-Chowdhury and J.S. Baras. A certificate-based light-weight authentication algorithm for resource-constrained devices. Technical report, CSHCN TR 2005-4, Center for Satellite and Hybrid Communication Networks, University of Maryland College Park, 2005.

* cited by examiner

METHOD AND SYSTEM FOR SOURCE AUTHENTICATION IN GROUP COMMUNICATIONS

CROSS-REFERENCE TO RELATED PATENT APPLICATION

This application claims priority from U.S. Provisional Application No. 61/171,216 filed on Apr. 21, 2009, the disclosure of which is incorporated herein by reference in their entirety.

STATEMENT REGARDING FEDERALLY SPONSORED R&D

This invention was made under government sponsorship: NCC8235 awarded by the National Aeronautics and Space Administration (NASA). The government has certain rights in the invention.

BACKGROUND

1. Technical Field

The present invention relates to source authentication in group communications, and more particularly, to a method by which a sender sending messages to multiple receivers signs the messages using symmetric cryptographic mechanisms and the messages can be verified by the receivers as coming from the purported sender.

2. Description of the Related Art

The following papers provide useful background information, for which they are incorporated herein by reference in their entirety, and are selectively referred to in the remainder of this disclosure by their accompanying reference numbers in triangular brackets. For example <1> refers to the 1997 paper by Krawczyk.

1. H. Krawczyk, M. Bellare, and R. Canetti. *HMAC: Keyed-Hashing for Message Authentication*. IETF RFC 2104, February 1997.
2. N.I.S.T. Digital signature standard (dss), May 19, 1994.
3. P. R. Zimmermann. *The official PGP user's guide*. MIT Press, May 3, 1995.
4. R. Housley, W. Ford, W. Polk, and D. Solo. *Internet X509 Public Key Infrastructure Certificate and CRL Profile*. IETF Network Working Group RFC 2459, http://www.ietf.org/rfc/rfc2459.bd, January 1999.
5. S. Gupta, and S. Chang. Performance analysis of Elliptic Curve Cryptography for SSL. In *Proceedings of the ACM Wireless Internet Security Workshop (WiSe '02)*, Atlanta, USA, Sep. 28, 2002. ACM.
6. P. Prasithsangaree and P. Krishnamurthy. On a framework for energy-efficient security protocols in wireless networks. *Elsevier Computer Communications*, 27:1716-1729, 2004.
7. S. Seys and B. Preneel. Power consumption evaluation of efficient digital signature schemes for low power devices. In *Proc. 2005 IEEE International Conference on Wireless and Mobile Computing, Networking and Communications (IEEE WiMOb 2005)*, volume 1, pages 79-86. IEEE, 2005.
8. W. Freeman and E. Miller. An experimental analysis of cryptographic overhead in performance-critical systems. In *Proc. 7th International Symposium on Modeling, Analysis, and Simulation of Computer and Telecommunication Systems (MASCOT'99)*, pages 348-357, College Park, Md., USA, October 1999. IEEE.
9. M. Bohge and W. Trappe. TESLA certificates: an authentication tool for networks of compute-constrained devices. In *Proc. of 6th international symposium on wireless personal multimedia communications (WPMC '03)*, Yokosuka, Kanagawa, Japan, October 2003.
10. A. Roy-Chowdhury and J. S. Baras. A certificate-based light-weight authentication algorithm for resource-constrained devices. Technical Report CSHCN TR 2005-4, Center for Satellite and Hybrid Communication Networks, University of Maryland College Park, 2005.
11. X. Ding, D. Mazzocchi, and G. Tsudik. Equipping smart devices with public key signatures. *ACM Trans. Internet Technology*, 7(1):3, 2007.
12. "Compaq iPAQ Pocket PC H3600 series," http://h18002.www1.hp.com/ products/quickspecs/10632 div/10632 div.HTML#%QuickSpecs.
13. N. Potlapally, S. Ravi, A. Raghunathan, and N. Jha, "A study of the energy consumption characteristics of cryptographic algorithms and security protocols," Mobile Computing, IEEE Transactions on, vol. 5, no. 2, pp. 128-143, February 2006.
14. A. Perrig, R. Canetti, D. Song, and J. D. Tygar. The TESLA broadcast authentication protocol. *RSA Cryptobytes*, Summer 2002.
15. M. Naor and M. Yung. Universal one-way hash functions and their cryptographic applications. In STOC '89: *Proceedings of the twenty-first annual ACM symposium on Theory of computing*, pages 33-43, New York, N.Y., USA, 1989. ACM.

Security is a necessary parameter in networks (such as wireless networks, hybrid wireless networks, etc.) if the communication between a pair of nodes, or a group of nodes, is to be protected from unauthorized access. In wireless networks, due to the open nature of the wireless channel, intruders can eavesdrop on the communication between other nodes if the messages are sent in the clear; they can inject fake messages into the network, purporting to come from other nodes, or attempt to modify or delete messages between other nodes. Therefore, strong security mechanisms to prevent such attacks are important, especially for scenarios like military operations where hybrid wireless networks can be of great use. In this context, a hybrid wireless network refers to a network architecture in which there is some centralized infrastructure, such as a satellite overlay, over large wireless networks. In such hybrid networks, the terrestrial wireless nodes are grouped into clusters, with each cluster having one or more "gateway" nodes with dual wireless and satellite connectivity, providing alternate high-bandwidth and robust forwarding paths through satellite links, in addition to the terrestrial wireless links.

Security of communication can be achieved using several different mechanisms. Encryption hides the messages in cipher text and thus prevents eavesdropping on the communication. In the process of authentication, each message is "stamped" with a unique "marker" of the originating node which ensures that messages are accepted from legitimate nodes only, and fake messages are discarded. Associated with authentication are message integrity protocols where each message is similarly stamped with a unique marker by the originating node so that any unauthorized modification in transit invalidates the marker and thus the modification can be easily detected.

For unicast communication, solutions for authentication and message integrity are trivial—the two communicating parties A and B share a secret exclusively between themselves and make use of this secret, or a key derived thereof, to "sign" the messages between themselves. The secret or key used can be based on symmetric cryptography that is fast, efficient, and does not consume significant computation or energy resources at the communicating nodes. The corresponding message signature is usually a Message Authentication Code, or MAC in short (for example, HMAC <1>), which is resource-efficient to compute and to verify, and limited in size.

The problem is more complicated for group communication. When multiple parties are taking part in a communication session, a shared secret between the parties is not a solution. For group communication, it is preferable that authentication be done based on asymmetric techniques where each node possesses a unique secret known to no other node, and makes use of that secret to authenticate itself, or the messages it generates. Public key cryptography allows such asymmetric authentication to take place. In public-key cryptography, each source uses its private key to sign messages it generates, creating a digital signature that is appended to the message <2>. The receivers can verify the signature using the corresponding public key of the node, which is known to everyone from the source's certificate. The primary requirement is that all users have access to a common third party node called the Certificate Authority (CA) that is universally trusted. The CA is responsible for binding a node's identity to its public key in the node's public-key certificate—for example, PGP <3> and X.509 <4>, which are the two most commonly used certificate formats. The certificate can be freely distributed to all nodes in a network, and the correctness of the certificate is verifiable by any node that has access to the CA.

FIG. 1 illustrates an example of a group communication scheme based on the public key infrastructure. Node A 101, Node B 102, and Node C 103 are nodes (exemplarily these nodes could be wireless nodes such as cell-phone units) which communicate with each other and there exists a central node 104, which is trusted by each of the nodes 101, 102, and 103. The central node acts as a certificate authority and issues each of the nodes 101, 102, and 103 their respective certificates which include among other things their respective identities and their public keys. Assume that A sends message X to B. Node A transmits to Node B message X, hash(X) signed with the private key of X, and the certificate for A. Node B receives the whole packet and retrieves hash'(X) using the public key of A obtained from the certificate for A. Next, Node B takes a hash of the message X and compares that to hash'(X). If they match, the message is authenticated and verified as coming from node A.

Public-key cryptography is a powerful tool that facilitates authentication, message integrity and also data encryption. However, it is computationally very expensive (both in CPU cycles and energy expenditure) to generate digital signatures for messages, and also to verify them <5,6,7,8>. The public and private keys are larger in size compared to symmetric keys, and the certificates also take up considerable storage space. In wireless networks where many of the nodes might have resource constraints, public-key cryptography can be a severe burden. For example, handheld devices have limited processor power, storage capacity and available energy. Performing digital signature generation and verification frequently can consume significant processor capacity and drain the battery quickly. Therefore in wireless networks, hybrid wireless networks, or in any network with resource constrained nodes, it is preferable to use authentication protocols that are based on symmetric cryptographic primitives—being efficient in terms of processing load, symmetric operations would expend less node energy. However, designing authentication protocols for group communication using symmetric cryptography is a significant challenge. The primary difficulty is how to create the asymmetry such that each participant has a unique secret with which to authenticate its messages, while allowing all the receivers the capability for validation. This is assuming that the security association between each source and the group of receivers is generated on-the-fly, and does not make use of pre-shared secrets between every pair of nodes, which is the trivial solution that does not scale well.

Therefore, it is an objective of the present disclosure to provide an asymmetric user authentication protocol for group communication, which would be especially useful where wireless mobile devices or devices where energy is a precious resource are used. User authentication/source authentication refers to the scheme by which a node proves to another node its identity, for example, node A claims to be node A and proves to node B that it is indeed node A. The techniques described in the present disclosure are based on a class of certificates called TESLA (Timed Efficient Stream Loss-tolerant Authentication Certificates) certificates. A prior art TESLA source/user authentication protocol was proposed in <14>. An authentication protocol using a TESLA certificate concept was originally proposed in <9>, and modifications and extensions to it were suggested in <10>. However, the prior art has certain problems which the provide motivation for the present disclosure.

In the TESLA certificate proposal described in <9>, the TESLA certificate algorithm allows a node to add authentication to packets it sends for a single period in time. The lifetime of the certificate is short. Therefore, a source node that transmits for multiple time intervals will need several TESLA certificates from the CA. If there are many sources that send data over long intervals, this can add up to a substantial overhead. The prior art algorithm focuses on point-to-point authentication between nodes of varying capabilities, for example, between a sensor node and its base station. It does not address authentication between peer nodes, or authentication in group communication. The algorithm also does not provide non-repudiation. Non-repudiation is a security term which means that a sender node cannot deny, at a later instant in time, that it had generated a message (in the past) that had been signed using its private key. Non-repudiation is an essential aspect of source authentication protocols for both unicast and group communication.

SUMMARY

Exemplary embodiments of the present invention address at least the above problems and/or disadvantages and other disadvantages not described above. Also, the present invention is not required to overcome the disadvantages described above, and an exemplary embodiment of the present invention may not overcome any of the problems listed above.

According to an exemplary embodiment, an extended TESLA source authentication algorithm is provided that uses symmetric cryptographic primitives to achieve asymmetric authentication of nodes in group communication, and also message integrity. The protocol (source authentication algorithm) can be efficiently implemented in any network that has some centralized infrastructure, and will be especially advantageous for hybrid wireless networks which can take advantage of the presence of the satellite overlay infrastructure. The protocol considers the resource limitations of the wireless nodes and the wireless characteristics of the terrestrial segment.

According to another exemplary embodiment, a new lightweight certificate which can be used in authentication is provided. A central node issues this certificate to a node requesting the certificate and the central node includes in the certificate a second key derived from a first key, which is sent to the central node by the node.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Exemplary embodiments of the present disclosure will now be described more fully with reference to the accompanying drawings.

In order to describe the operation of the extended TESLA source authentication protocol according to an exemplary embodiment, consider a group of three wireless nodes A, B and C, where A sends messages to B and C. It will be understood that the number of source nodes (wireless nodes in this example) has been shown to be three. However, the number three is just an example and any number of source nodes can be accommodated in this design. The objective is to design an authentication mechanism that allows B and C to securely authenticate messages from A using a computationally efficient algorithm that expends low node energy. The following assumptions are made about the initial security setup of the network for authentication purposes:

All three nodes have limited energy and processing power, and none has any pre-existing security information about the others; the public key $+K_{CA}$ of the CA is available to all nodes; all nodes are time-synchronized with the CA; appropriate security policies are in place to allow each node to securely identify itself to the CA during the initial bootstrapping phase, and each node X shares a unique secret key $K_{CA,X}$ with the CA; one-way functions $F_1$ and $F_2$ <15> are publicly available; message transmission from A to B and C start at time $t_0$; and time is divided into intervals, each of duration $\Delta$.

During the initial setup, before any messages are transmitted in the network, the CA and all sources (A, B, and C) generate the keys that each will need for message authentication. The sets of keys are generated using the well-known TESLA algorithm. The CA uses a TESLA key chain $\{tK_{CA,i}\}$, $i=\{1, \ldots, N\}$ to authenticate the TESLA certificates that it generates for the group sources. The CA generates a random seed $s_{CA,N}$ and applies one-way function $F_1$ to $s_{CA,N}$ to form the following hash chain $$s_{CA,0} \stackrel{F_1}{\leftarrow} s_{CA,1} \stackrel{F_1}{\leftarrow} \ldots \stackrel{F_1}{\leftarrow} s_{CA,N-1} \stackrel{F_1}{\leftarrow} s_{CA,N} \qquad \text{Equation 1}$$

where N>0 is equal to the number of unique MAC keys that the CA expects to use for authenticating the certificates and messages it generates. The value N depends on the length of each time interval and the total duration that the CA node will perform the function of the CA. It is assumed that in each time interval, the CA uses only one key for computing the MACs on all the messages it generates in that time interval. Therefore, if the total time of CA's functionality is T and the interval for key disclosure is d, $$N = \frac{T}{d}.$$

Figure 1:
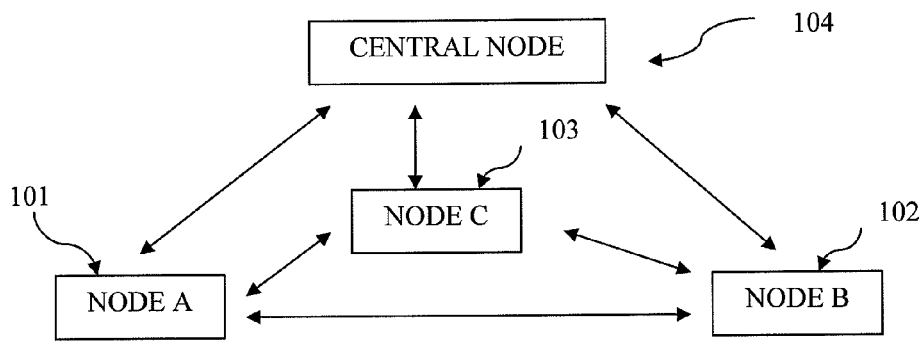
FIG. 1 illustrates an example of a conventional group communication scheme based on the public key infrastructure.
Figure 2:
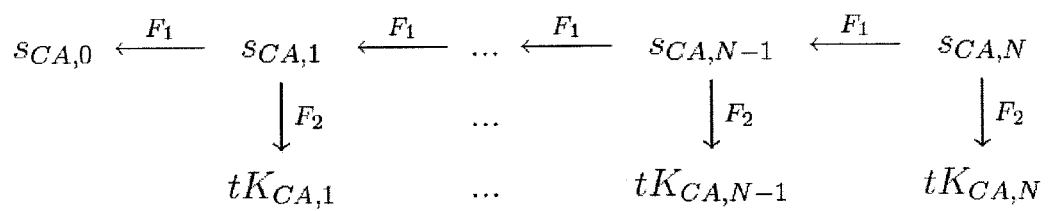
FIG. 2 illustrates an exemplary authentication key chain generated by a certificate authority using a random seed key generated by the certificate authority.

Subsequently the CA applies function $F_2$ to each element of the hash chain (equation 1 above) to obtain the certificate keys $tK_{CA,i}$ as illustrated in FIG. 2 and which the CA uses in the certificates it generates. $s_{CA,0}$ is the anchor element of the CA's authentication key chain (also referred to above as the hash chain). All TESLA certificates and signed messages from the CA are authenticated based on the anchor element during the initial protocol run.

Importantly, the anchor element of the CA's authentication key chain, i.e., the element $S_{CA,0}$, is broadcast to the network at time $t<t_0$. The CA generates a public-key based digital signature on the message containing the anchor element and broadcasts the message with the signature as follows:

$$\text{CA} \rightarrow \text{network:} (s_{CA,0}, \text{SIGN}_{-K_{SA}}(\ldots)) \qquad \text{Equation 2}$$

The anchor element may itself be authenticated by the other network nodes using traditional public-key cryptography. All network nodes receiving the broadcast message verify the signature on the broadcast message (equation 2) using the public key $+K_{CA}$ of the CA. If the signature is verified, the nodes store in local memory the key $s_{CA,0}$ along with the broadcast message.

Figure 3:
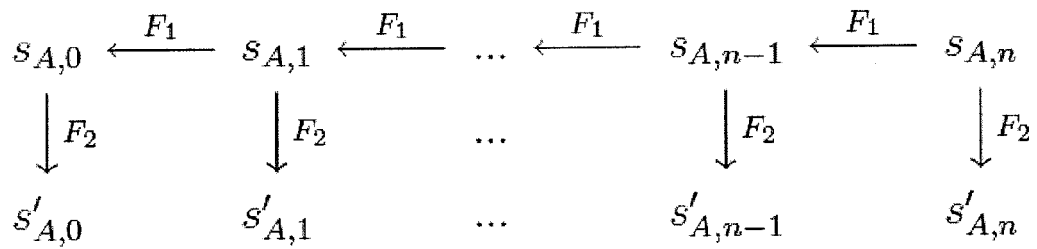
FIG. 3 illustrates an exemplary authentication key chain generated by a source node using a random seed key generated by the source node.

In a manner similar to the above, source node A generates a random seed key $s_{A,n}$ and applies one-way function $F_1$ to $s_{A,n}$ to form its authentication key chain (also referred to as a hash chain), before any messages are sent by A. A subsequently applies $F_2$ to each key $s_{A,i}$ generated above and obtains the output $s'_{A,i}$ as illustrated in FIG. 3. Similarly, each of the source nodes B and C would generate their authentication key chains.

Here n>0 is equal to the number of unique MAC keys that A expects to use for authenticating its messages. The value n depends on the length of each time interval and the total duration of A's transmission. In here, it is assumed that in each time interval $\Delta$, a source uses only one key for computing the MACs on all the messages it generates in that time interval. Therefore, if the total time of A's transmission is T, $$n - \frac{T}{\Delta}.$$

It should be noted that n, which is the number of unique MAC keys in A's key chain may or may not be equal to N, which is the number of unique keys in the CA's key chain (FIG. 2).

Figure 4:
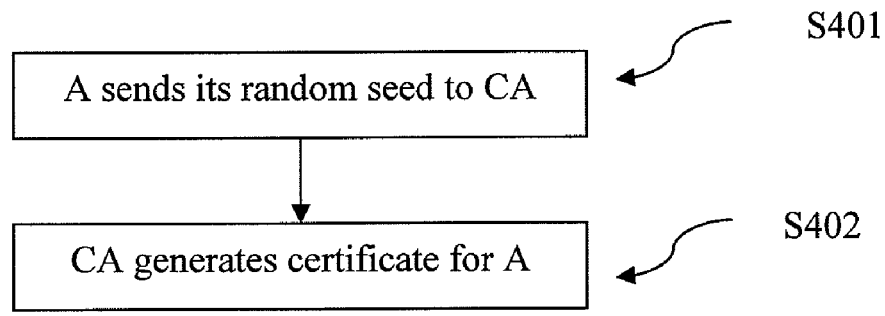
FIG. 4 illustrates an exemplary method for generating certificates.

FIG. 4 illustrates a method by which the CA generates a certificate for source node A. FIG. 4 only illustrates the method with respect to source node A; however, the same method may be used to create certificates for each of the other source nodes B and C. In 5401, at time t<$t_0$, A sends $s_{A,n}$ (the random seed key for A's key chain) and the number n to the CA, along with details on A's key disclosure interval $\Delta$. The message from A to the CA may be secured using a shared secret $K_{CA,A}$ between A and the CA. The CA obtains all the elements of A's authentication key chain from $s_{A,n}$ and n, as in equation 1 and FIG. 3 because the CA also knows the one-way functions F1 and F2. Similarly, the CA can obtain all the elements of B and C's authentication key chain when B and C request certificates from the CA.

On successful verification of A's identity, the CA generates the TESLA certificate (or more generally a certificate that can be used for authenticating A) for A in S402 using the random seed key received from A in S401. Next, the CA transmits the certificate to A:

$$CA \to A: \text{Cert}_{CA}(A)$$

Figure 5:
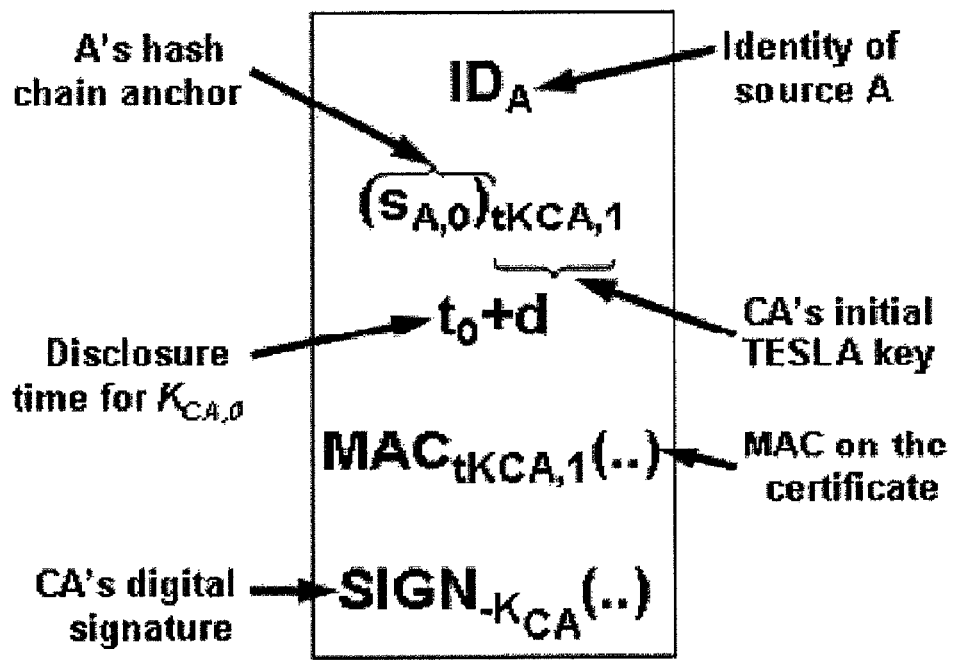
FIG. 5 illustrates an exemplary certificate generated by the certificate authority.

FIG. 5 illustrates an exemplary certificate generated by the CA for source node A. The key $s_{A,U}$, which is the anchor element of A's key chain is included in the certificate. The key $s_{A,0}$ is encrypted using the certificate key $tK_{CA,1}$ from the CA's key chain from FIG. 2. The certificate also includes the identity of the source node A and the time $t_0$+d up to which the certificate is valid, i.e., after time $t_0$+d, key $s_{A,0}$ is made public to the group and it can no longer be used for new messages. The certificate also contains a MAC for authentication, computed on the previous elements using $tK_{CA,1}$. For added security, the certificate might also contain CA's public-key signature on all the previous elements.

$$\text{Cert}_{CA}(A) = (ID_A, \{s_{A,0}\}_{tK_{CA,1}}, t_0 + d, \text{MAC}_{tK_{CA,1}}(\ldots), \text{SIGN}_{-K_{CA}}(\ldots))$$

Here $d \geq \Delta$ is the key disclosure delay for the CA TESLA signature key, and $tK_{CA,1}$ is the CA MAC key for the time period $\langle t_0, t_0+d \rangle$.

Figure 6:
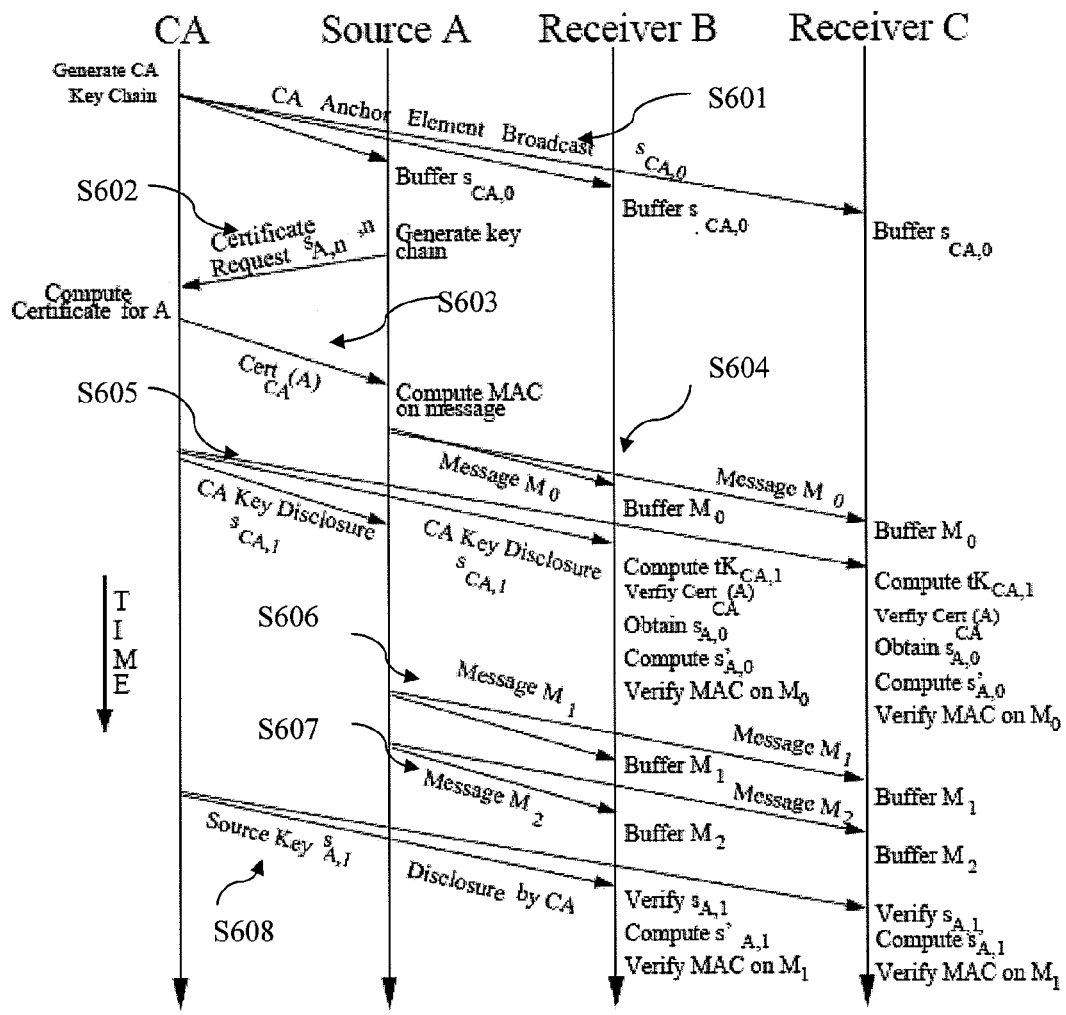
FIG. 6 illustrates an exemplary extended TESLA authentication protocol in which the certificate authority is used as proxy for storing and distributing the TESLA keys of the source nodes.

FIG. 6 illustrates an exemplary method for message transmission and authentication using a central node (certificate authority). FIG. 6 is also a time diagram and illustrates the timing of the different steps in the exemplary method. In S601, the central node (CA) transmits the anchor element ($s_{CA,0}$) of its authentication chain to all the nodes (A, B, and C are exemplarily shown in FIG. 6) to which it is connected. The anchor element may be signed by the central node and then transmitted as shown in equation 2 above. Of course, it is possible that the CA transmits the anchor element to only a subset of nodes depending on various conditions such as time of the day, or any other preference. Furthermore, it is also possible that the CA broadcast one of the earlier keys in the authentication key chain of A. It will be apparent to one of ordinary skill in the art that the authentication protocol can be easily modified to not broadcast the anchor element first up and instead broadcast a key which was created before the anchor element.

Now, assume that A is trying to send messages to B and C starting in the time interval $\langle t_0, t_0+d \rangle$. Therefore, prior to the starting of this time period, A requests a certificate from the central node and sends to the central node the random seed key for its authentication key chain in S602. Once A receives a certificate similar to that shown in FIG. 5 in S603, A computes a MAC over the message $m_0$ using $s'_{A,0}$ (from its authentication key chain FIG. 3) and includes its TESLA certificate $\text{Cert}_{CA}(A)$ with the message and sends the complete packet to receivers B and C in S604.

$$A \to \{B, C\}: \{M_0 | M_0: (m_0, \text{MAC}_{s'_{A,0}}(m_0), \text{Cert}_{CA}(A))\}$$

The MAC of the message $m_0$ may be computed by taking its hash and signing the hash with $s'_{A,0}$.

Each of B and C checks the freshness of the received certificate by checking the timestamp of $\text{Cert}_{CA}(A)$ to make sure it has arrived within the period $\langle t, t_0+d \rangle$. The receivers also check that $s'_{A,0}$ is not publicly known, i.e., $\text{MAC}_{s'_{A,0}}(m_0)$ cannot yet be computed by them. If all the checks pass, B and C store $M_0$ in their respective buffers, else they discard the message.

On or about time $t_1 = t_0+d$, in S605 the CA broadcasts the key $s_{CA,1}$ to the network:

$$CA \to \text{network}: (\langle t_0, t_0+d \rangle, s_{CA,1}, \text{SIGN}_{-K_{CA}}(\ldots))$$

If receiver B or C has received the anchor element $s_{CA,0}$, they can check the authenticity of $s_{CA,1}$ by verifying $s_{CA,1}$ against $s_{CA,0}$. This can be done by performing the one-way function F1 on $s_{CA,1}$ and comparing the result with $s_{CA,0}$.

Alternatively, B or C can verify $s_{CA,1}$ from the signature using $+K_{CA}$. If verification is successful, each receiver derives $tK_{CA,1}$ from $s_{CA,1}$ (as shown in FIG. 2) and uses $tK_{CA,1}$ to verify the MAC on $\text{Cert}_{CA}(A)$. If the MAC is correct, receiver B obtains $s_{A,0}$ from $\text{Cert}_{CA}(A)$ by decrypting with $tK_{CA,1}$. Alternatively, it is also possible that the CA broadcast $s_{A,0}$. B obtains $s'_{A,0}$ from $s_{A,0}$ (as shown in FIG. 3). Then B checks $\text{MAC}_{s'_{A,0}}(m_0)$ using $s'_{A,0}$ and accepts $m_0$ if the MAC verifies correctly. B saves $\text{Cert}_{CA}(A)$ and the anchor element $s_{A,0}$ of A's key chain in long-term memory—they are used for authenticating future keys and messages from A.

Messages from A to B in subsequent time intervals use the corresponding key of A's key chain to compute the MAC. For example, in steps S606 and S607, A transmits messages M1 and M2 but does not include its TESLA certificate in messages subsequent to $M_0$, under the assumption that every receiver has received $M_0$ correctly. For example, in the period $\langle t_i, t_i+\Delta \rangle$, message from A to B would look like:

$$A \to B: \{M_i | M_i: (m_i, \text{MAC}_{s'_{A,i}}(m_i))\}$$

At time $t_i+d$, the CA broadcasts $s_{A,i}$ to the network (in case of messages M1 and M2, in S608 the central node/CA broadcasts to the network $S_{A,1}$). Since $d>\Delta$, when $s_{A,i}$ is disclosed, A is no longer using $s'_{A,i}$ for computing the MACs on its messages. Any receiver B that receives the CA broadcast, verifies that $s_{A,i}$ indeed belongs to A's MAC key chain by applying the one-way function F1 multiple times to the received key as shown below.

$$s_{A,i} \xrightarrow{F_1} s_{A,i-1} \xrightarrow{F_1} \ldots \xrightarrow{F_1} s_{A,0}$$

The above verification is correct since $F_1$ is a secure one-way function and $s_{A,0}$ has already been verified from $\text{Cert}_{CA}(A)$. However, if B wants to be additionally careful, it can verify $s_{A,i}$ going through the additional steps described above, using the CA key broadcast message and $\text{Cert}_{CA}(A)$. Additionally, B may verify the MAC on the received message by taking a hash on the received message M1 and then signing the hash with the $S'_{A,I}$. Then the result is compared with the received MAC which was generated using $S'_{A,1}$.

It should be noted that the burden of disclosing the keys to the various receivers has been shifted to the central node/certificate authority which now acts as a proxy for storing and distributing the keys for each of the other nodes.

After the initial anchor element broadcast message from the CA signed with $-K_{CA}$, subsequent key disclosure messages from the CA can be authenticated using one-way chains. For example, CA discloses the key $s_{CA,i}$ used in period $\{t_i, t_i+d\}$ at time $t_i+d$. Subsequent key disclosure messages disclosing the keys $s_{CA,i}$ may occur when messages from B (or a node other than A) are to be authenticated and a certificate needs to be provided for that node, at which time the CA may exemplarily broadcast $s_{CA,i}$ where i>1 because i=1 has already been used for A. Any receiver can then verify that $s_{CA,i}$ belongs to CA's one-way chain:

$$s_{CA,i} \stackrel{F_1}{\to} s_{CA,i-1} \stackrel{F_1}{\to} \ldots \stackrel{F_1}{\to} s_{CA,0}$$

where $s_{CA,0}$ has been verified before using $+K_{CA}$. The receiver does not need to check CA's signature to verify $s_{CA,i}$.

Thus messages from A to B and C can be authenticated. The above algorithm requires A to perform one signature verification to verify the certificate it receives from the CA. Each receiver also performs one signature verification on the anchor element broadcast message from the CA. All other messages from the CA and the sources can be authenticated using low-computation symmetric MACs. Moreover, sources and receivers do not have to perform clock synchronization directly with one another, synchronizing with the CA is a necessary and sufficient condition for the protocol. This saves additional message rounds and protocol complexity, and also breaks the cyclical dependency between authentication and clock synchronization.

In the above described exemplary implementation, the CA broadcasts the MAC keys of the source nodes to the network at periodic key disclosure intervals. In an exemplary hybrid network topology, a satellite may be used for providing CA services. The reasons for using the satellite as the CA may be as follows. The satellite is a network node that is always available, connected to the entire network, and is physically secure. The satellite has higher computing power with on-board processing capability and higher storage compared to terrestrial wireless nodes. Its energy is technically infinite, since it is renewable via solar power. Therefore the satellite can perform processing-intensive cryptographic operations more efficiently compared to the terrestrial nodes. The presence of the satellite thus allows implementation of highly efficient and secure centralized authentication. In such an implementation, the satellite would generate the TESLA certificates for all the terrestrial user nodes, and would act as the proxy for the terrestrial nodes for disclosing the MAC keys used by the nodes for authentication and message integrity, i.e., as described above instead of the source node, the satellite (CA) broadcasts the MAC keys at regular time intervals. Therefore the MAC keys reach all the user nodes in one broadcast transmission. This saves the delay in authentication, and reduces the processing load on the source nodes, and also the network transmission overhead.

In an exemplary implementation, non-repudiation may be added to the extended TESLA authentication protocol by modifying the mechanism of key disclosure by the central node (or the CA). This may be achieved as follows. The source node (for example node A) would authenticate each message it sends to B and C by two or more MACs, computed using keys from two or more key chains, respectively. That is, the node A would generate more than one authentication key chain and each packet sent to node B will have the message and two or more MACs. The anchor element of each chain is shared between the source and the central node as described earlier. The anchor elements of all the key chains used by A are also included and bound to A's identity in A's certificate by the CA.

Each receiver (B and/or C) buffers the message along with all the MACs if the basic security check is satisfied. The basic security check refers to checking the freshness of the certificate (if received) and checking whether the received packet arrived within a certain time interval. At the time of key disclosure, the CA broadcasts only one of the MAC keys out of the set of MAC keys for the given source node and message. Each receiver verifies the single MAC associated with the key broadcast by the CA, and accepts the message as correct if the MAC is verified. If any receiver wants to be able to check the message for non-repudiation at a later time instant, it saves the message along with all its MACs.

The CA discloses only one MAC key from the available set at the time of key disclosure. The MAC key that is disclosed by the CA is chosen at every disclosure instant, with uniform probability from the set of available keys for that time interval. Therefore, the source cannot know in advance, with a high degree of probability, which key will be used by the receivers for authentication. Hence, if the source would like its messages to be accepted by the receivers, it will have to include all the MACs correctly computed with the corresponding keys.

If at a later instant in time, a receiver would like to prove that a message was indeed generated by the source (i.e., non-repudiation), the receiver can simply send a non-repudiation request to the CA. Upon receiving the request, the CA discloses one of the previously undisclosed MAC keys for the message in question. The receiver can compute the MAC for the message with the newly disclosed key and compare the MAC with the set of MACs it had saved previously. If the CA and the receiver operates correctly, the newly computed MAC will match one of the saved MACs. Since: (i) the undisclosed MAC keys were known only to the source and the CA, and (ii) the CA is universally trusted, therefore the saved MAC must have been computed by the source using its MAC key and hence the message must have been generated by the source. Thus non-repudiation is achieved.

The security of the above non-repudiation algorithm is proportional to the number of MACs included with each message. For two MACs per message, the probability of a particular key being disclosed by the CA is 0.5. This probability is called the r-factor, where r is an acronym for repudiation. The r-factor is computed as the inverse of the number of MACs included with each message.

Instead of sending a request for an undisclosed key, the receiver may also send the entire message along with the saved MACs, to the CA. The CA itself will compute the MACs on the message with any one of the undisclosed keys and compare with the saved MACs sent by the receiver. Since the undisclosed keys are known only to the CA and the source, in the event of a match, the CA can confirm to the receiver that the message was indeed generated by the source.

In the above-described extended TESLA authentication protocol, the central node/CA has been used to create and issue the certificates as well for acting as a proxy for distributing the MAC keys of the source nodes. However, it will be understood that this functionality may be split between two units or processors. For example, a first unit/terminal/processor may generate and issue the certificates and the second unit/terminal/processor may generate and store the MAC keys of each of the source nodes, i.e., generate and store the complete authentication key chain illustrated in FIG. 3 for each of the source nodes. Furthermore, the second unit may also distribute the MAC keys at appropriate time intervals.

It is also possible that the central node issues to a source node a single certificate, which has more than one anchor element. This may be the case when a source node is associated with different groups and has multiple authentication key chains. This will also be the case when the authentication framework includes non-repudiation, and thus the source node A computes two or more MACs on each message it sends. Therefore A's certificate will contain the anchor elements of all the key chains it uses to compute the two or more MACs.

Figure 7A:
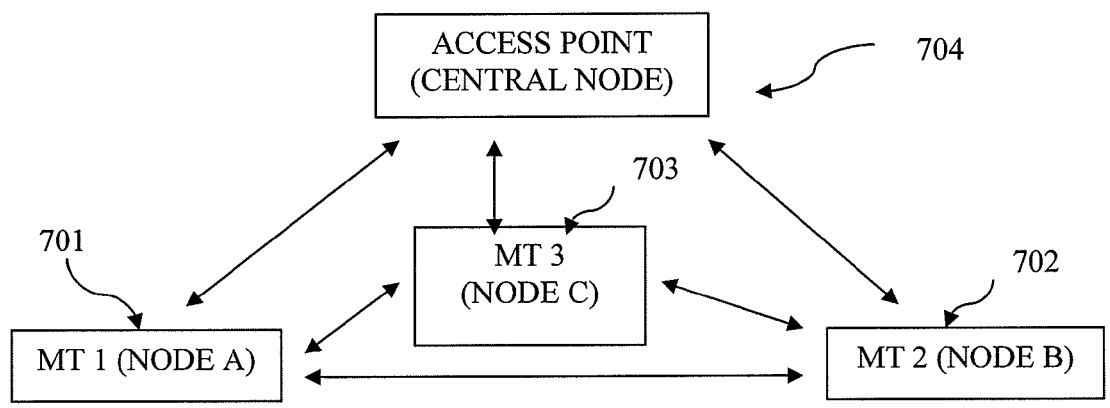
FIG. 7A illustrates an exemplary system according to the present disclosure.

FIG. 7A illustrates an exemplary system which has a wireless access point 704, which acts as a central node/certificate authority. Mobile terminals 701, 702, and 703 communicate with each other and the access point 704. The mobile terminal could be a cell-phone, a device with wireless access such as the recently introduced IPAD by Apple, INC., etc. The wireless access point functionality could be provided by a server or any other terminal that can carry out many computations and is not necessarily energy constrained.

Figure 7B:
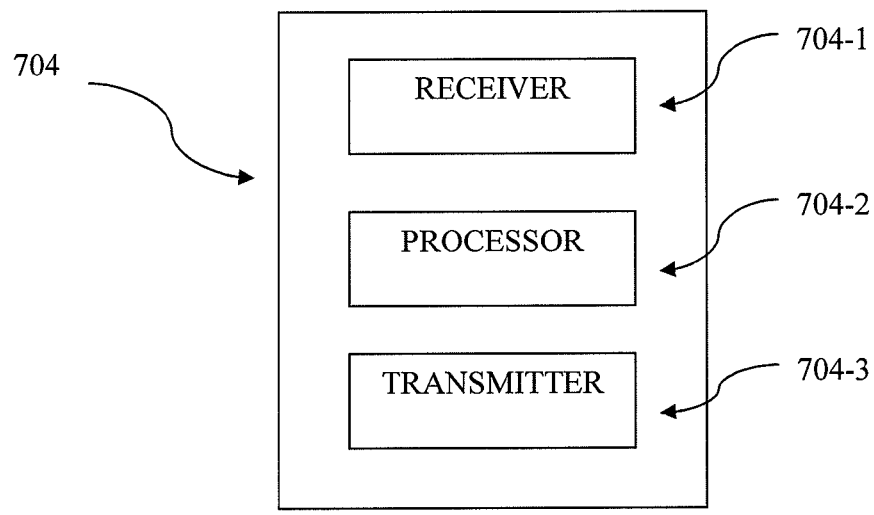
FIG. 7B illustrates an exemplary central node according to the present disclosure.
Figure 7C:
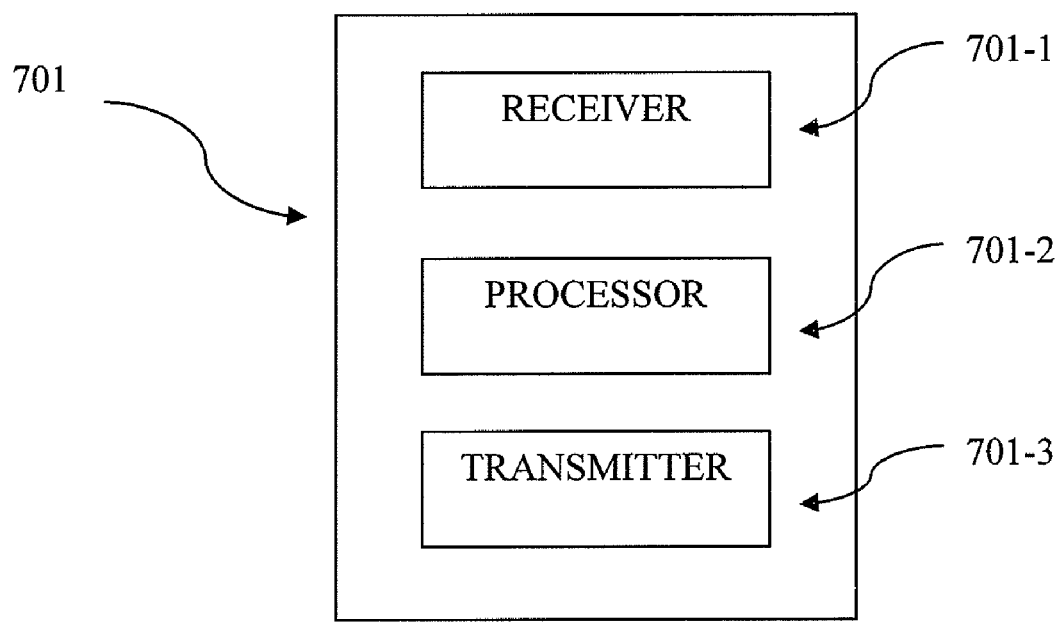
FIG. 7C illustrates an exemplary mobile terminal according to the present disclosure.

FIG. 7B illustrates the basic building blocks of the central node 704. The central node 704 includes a receiver 704-1, a processor 704-2, and a transmitter 704-3. Similarly, FIG. 7C illustrates a mobile terminal 701 which includes a receiver 701-1, processor 701-2, and transmitter 701-3.

One of ordinary skill in the art will understand the appropriate hardware that would be used for each of these building blocks. For example, the processors may be digital signal processors, ASICS, etc. with a memory component.

Figure 8:
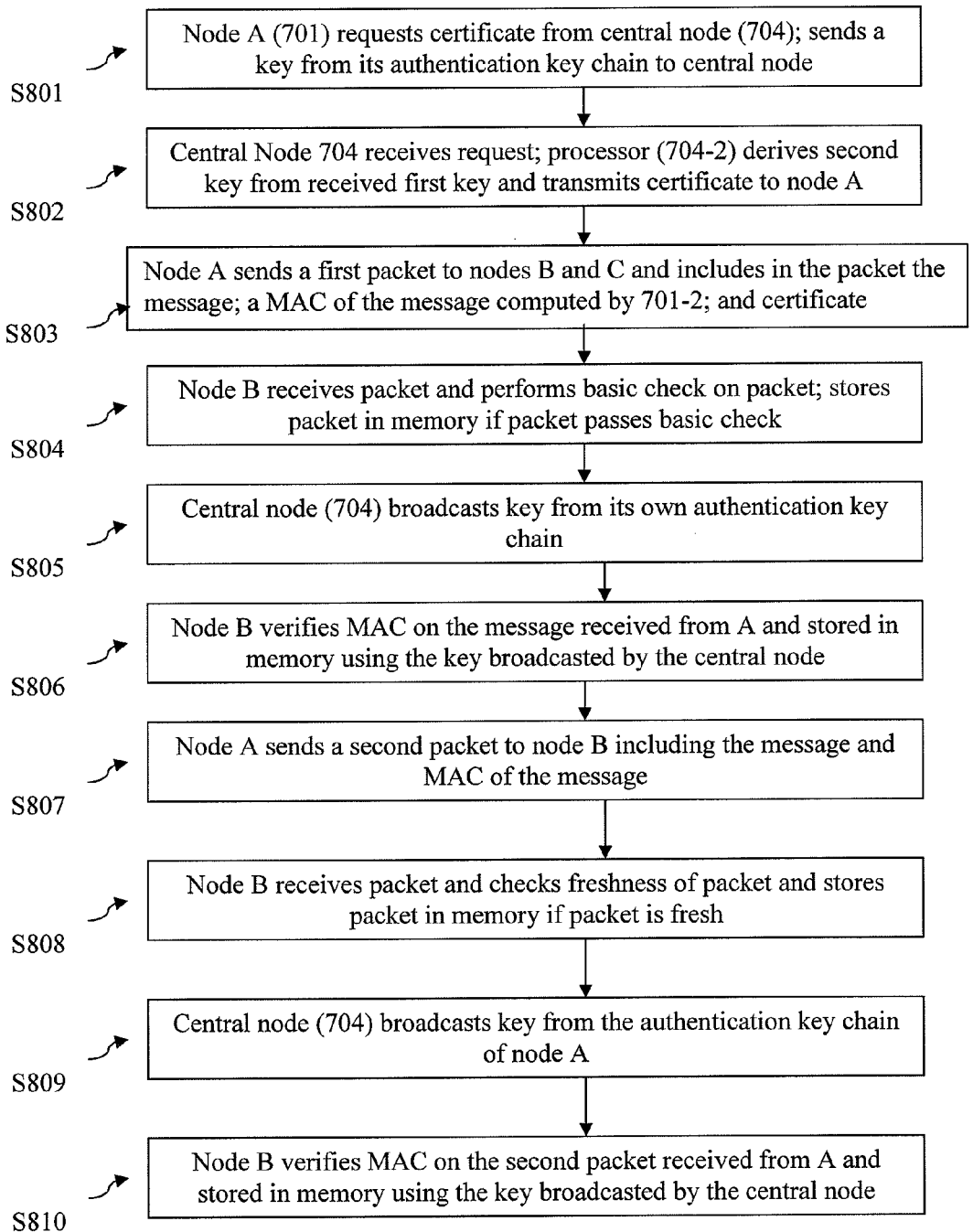
FIG. 8 illustrates an exemplary source authentication protocol.

FIG. 8 is a simplified description of the extended TESLA authentication protocol discussed in FIG. 6. In S801, mobile terminal 1 (node A) 701 requests a certificate from the central node 704. Node A sends this request along with a first key from its authentication key chain. Exemplarily, the first key may be the root key/randomly generated seed key of its authentication key chain illustrated in FIG. 3. In S802, the receiver 704-1 of the central node receives the request and forwards the request to the processor 704-2. The processor derives a second key from the received first key and generates a certificate for A by including the second key therein. Exemplarily, the second key is the anchor element of the authentication key chain of node A. The second key is exemplarily derived by repeatedly applying a one-way function to the first key. The transmitter 704-3 then transmits the certificate to node A. Exemplarily, the central node obtains the complete authentication key chain of node A by using the information sent by node A, i.e., node A sends to the CA the number of MAC keys in A's authentication key chain and the seed key of A's authentication key chain. It is also possible that the central node derive a second authentication key chain which has overlapping elements with A's authentication key chain. For example, the central node may generate n+x (where x>1) keys instead of n keys which A generates using the seed key.

In S803, node A sends a first packet to nodes B and C (702 and 703). The rest of the description of FIG. 8 is with respect to node B; however, identical steps will be also be applicable to node C. If this is the first time that A and B are communicating or if B does not know A, A includes in the packet: (1) the message (2) MAC on the message computed by taking a hash on the message and signing it with a key from its authentication key chain (3) the certificate of A. The packet may be generated by processor 701-2 and sent using transmitter 701-3.

In S804, Node B receives the packet and performs a basic check on the packet. A basic check may include checking the freshness of the certificate. If the packet passes the basic check, the packet is stored in memory. In S805, the central node broadcasts a key from its own authentication key chain shown in FIG. 2. Exemplarily, the key for this broadcast may be the same key with which the second key was encrypted in the certificate issued to node A.

In S806, node B verifies the MAC on the message stored in its memory and which was previously received from node A. This verification may be a two-step process. In a first step, the key broadcast in S805 is verified. In the second step, the MAC on the received message may be verified. If the MAC is verified, the message is authenticated as coming from node A.

In S807, node A sends another packet to node B. This time, the packet does not include the certificate. In S808, node B performs a basic check on the message and stores the message in its memory. In S809, the central node 704 broadcasts another key but this time from the authentication key chain of node A that is computed using the seed key of node A's authentication key chain, and not its own key chain. Furthermore, keys that were created later in the authentication key chain are broadcast earlier. In S810, node B completes the message verification and authentication by using the key broadcast by the central node in S809.

Figure 9:
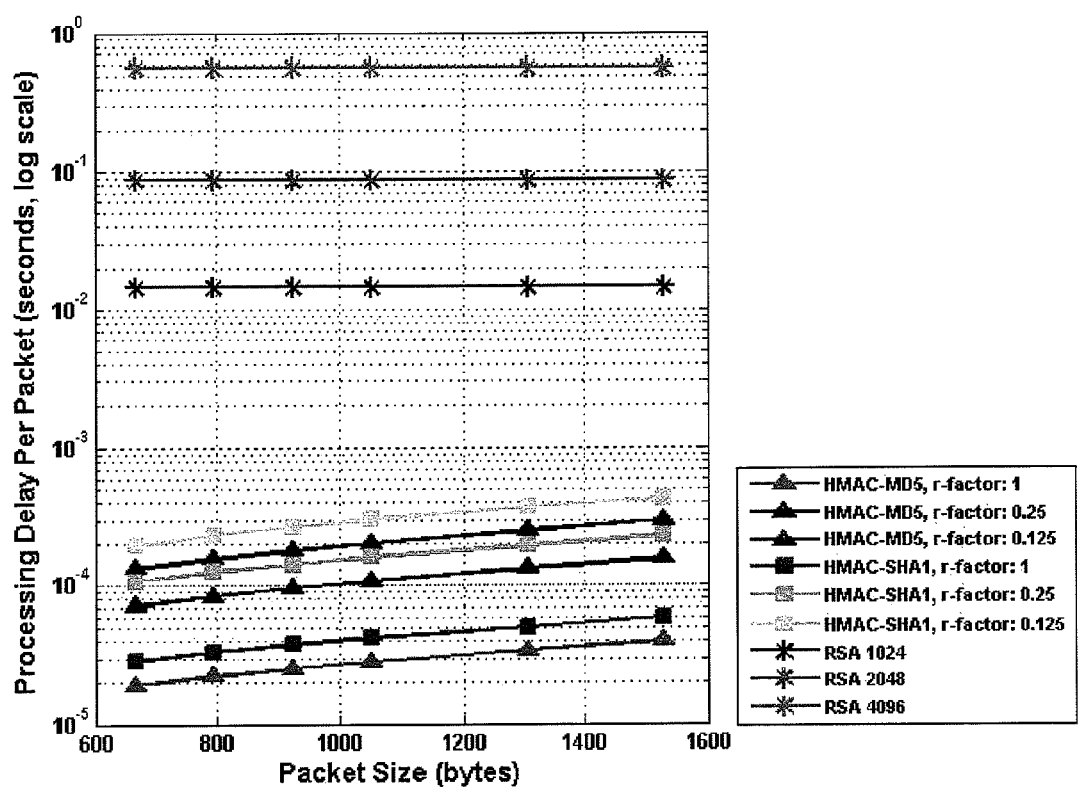
FIG. 9 illustrates simulation results comparing the processing delay per packet of the conventional RSA based source authentication scheme with the novel extended TESLA authentication protocol.
Figure 10:
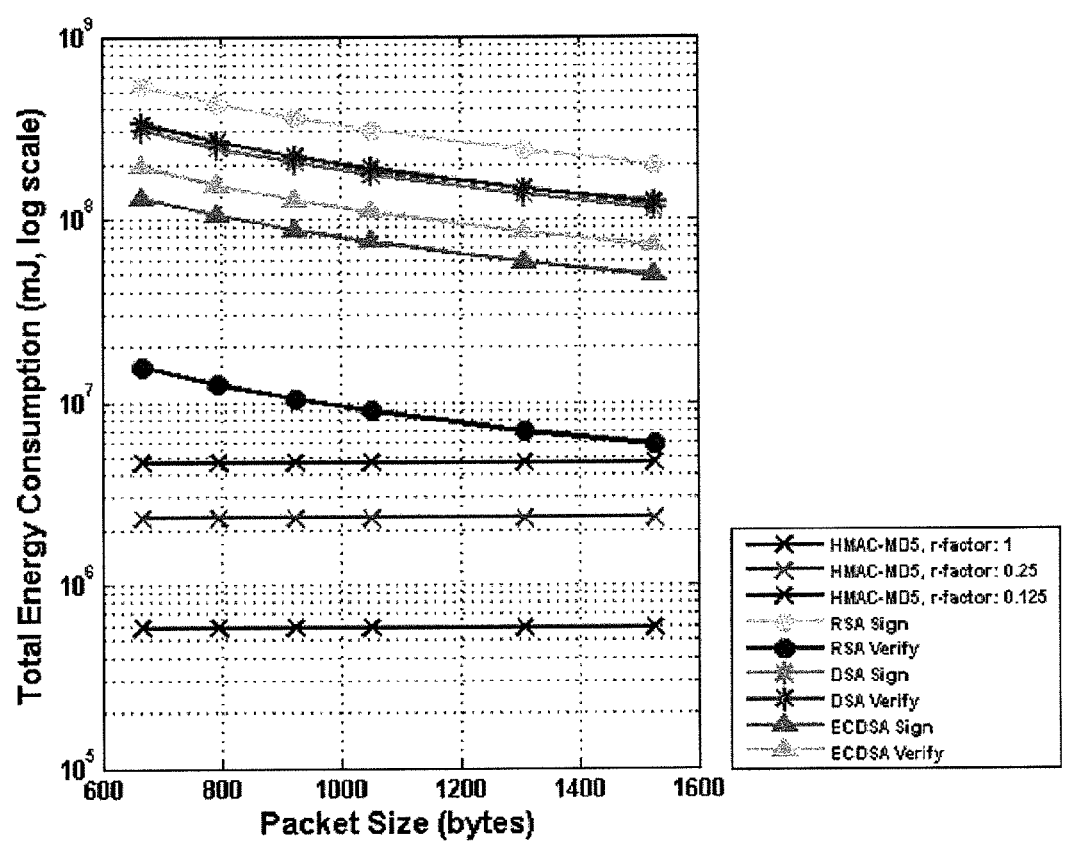
FIG. 10 illustrates simulation results comparing the energy consumption of conventional source authentication schemes with the novel extended TESLA authentication protocol.

Next, results from the performance analysis of the scheme described in FIGS. 6 and 8 are presented with respect to FIGS. 9 and 10.

Compared to asymmetric source authentication using public-key cryptography, the system and method described above offers much greater savings in power expenditure and processing delay for authentication. An analysis of the processing delay overhead of the proposed protocol, used with HMAC-MD5 or HMAC-SHA1, and its comparison to the processing delay for RSA signatures, is illustrated in FIG. 9, for a 500 MB message on a 500 MHz PentiumIII machine. The delay figures for HMAC-MD5 and HMAC-SHA1 are computed based on the approximation that each operation is executed in one processor clock tick for the 500 MHzPIII processor. The delay figures for RSA for the 500 MHzPIII processor are from <11>. The r-factor in the graphs refer to the degree of non-repudiation provided by a probabilistic non-repudiation algorithm that is used in the above described method, and is related to the number of TESLA MACs attached to each message. An r-factor equal to 1 indicates one MAC per message, which is described in the algorithm described above; while an r-factor 0.25 refer to 4 MACS per message, and so on.

FIG. 10 compares the amount of energy that would be required to authenticate a 500 MB message on a representative handheld computer <12> for different authentication algorithms. The base figures for energy expenditure of different cryptographic operations of the handheld are obtained from <13>. Clearly, authenticating a 500 MB message without additional energy sources is not possible except for the extended TESLA protocol described in the present disclosure. The graphs validate the claim that the energy consumption of the extended TESLA protocol of the present disclosure is significantly less in comparison to standard signature protocols. Here, it is assumed that up to 50% of the node energy is spent in authenticating the data packets.

The disclosed extended TESLA authentication protocol has an additional advantage that it avoids the assumption that the user nodes have some sort of security association established apriori, as many other prior art protocols assume.

The above described extended TESLA authentication protocol has a wide variety of uses such as in broadcast authentication in sensor networks, authentication of control messages in wireless ad hoc network routing protocols, etc. An example application of the authentication protocol would be in digital transmission of paid television programming to be displayed on hand-held wireless mobile smart devices belonging to subscribers. The television network provider would be authenticating the video stream using its key chain, and broadcasting the video stream to the subscribers over the satellite channels. The satellite itself would act as the CA and the proxy and broadcast the keys to the receivers. The video stream can be broken up into millions of packets at the IP-layer, and each packet is authenticated using keys from the key chain. In this scenario, using public-key authentication on the video stream packets would rapidly drain the battery of the hand-held wireless mobile smart devices. Another example would be packet-level authentication of voice and video being sent by soldiers on the ground to their commanding station, where each soldier has a hand-held transmitter/receiver device capable of sending and receiving voice, video and data using a satellite overlay. Here data being sent by the soldier to multiple other soldiers and/or the command post can be authenticated using the extended TESLA authentication scheme. Likewise, the commands being sent from the commanding post to the soldiers in the field can be authenticated.

Exemplary implementation described above with reference to flowchart illustrations and/or block diagrams of methods, apparatus (systems) can be implemented using computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks. For example, instructions embodied on a computer-readable medium can be executed by a processor to provide the functionality of either the central node or the other nodes (A, B, C).

More generally, computer program instructions may be stored in a computer readable medium that can direct a computer, or other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A central node for issuing certificates to a plurality of nodes associated with the central node in a network, the central node comprising:
   a receiver that is configured to receive a first key from at least one node from among the plurality of nodes;
   a processor which is configured to generate a second key based on the received first key and generate a certificate for the at least one node; and
   a transmitter that is configured to transmit the generated certificate to the at least one node, wherein:
      the first key is a key from a first authentication key chain comprising a plurality of keys generated by the at least one node for use in authenticating messages transmitted by the at least one node, the at least one node configured to generate a third authentication key chain comprising a plurality of keys and further configured to authenticate messages using at least two message authentication codes that are computed using a unique key from each of the first authentication key chain and the third authentication key chain, and
      the certificate generated by the processor includes the second key and an identity of the at least one node.

2. The central node according to claim 1, wherein the first key is a first randomly generated seed key generated by the at least one node, which uses the first randomly generated seed key to generate remaining keys in the first authentication key chain of the at least one node by repeatedly applying a first one-way function.

3. The central node according to claim 2, wherein the processor is further configured to generate the first authentication key chain using the received first key by applying the first one-way function to the received first key.

4. The central node according to claim 3, wherein the processor is further configured to generate a second authentication key chain by randomly generating a second seed key and repeatedly applying the first one-way function, wherein the second key is encrypted by a key from the second authentication key chain and the encrypted second key is included in the certificate for the at least one node.

5. The central node according to claim 3, wherein the transmitter is configured to broadcast to the network a unique key from among the keys in the first authentication key chain, and wherein the broadcast repeatedly occurs in time after a fixed interval.

6. The central node according to claim 2, wherein the receiver is further configured to receive a third key from the at least one node, and wherein the processor is further configured to generate a fourth key based on the received third key.

7. The central node according to claim 6, wherein the third key is a randomly generated seed key generated by the at least one node, which uses the third key to generate remaining keys in the third authentication key chain of the at least one node by repeatedly applying a third one-way function.

8. The central node according to claim 7, wherein the third one-way function is same as the first one-way function.

9. The central node according to claim 7, wherein the processor is further configured to generate the third authentication key chain using the received third key by applying the third one-way function to the received first key.

10. The central node according to claim 6, wherein the fourth key is the anchor element in the third authentication key chain of the at least one node.

11. The central node according to claim 1, wherein the second key is the anchor element in the first authentication key chain of the at least one node.

12. A non-transitory computer-readable storage medium storing program instructions for execution by a processor, the program instructions, when executed, configured to cause the processor to perform operations comprising:
receiving a first key from at least one node from among a plurality of nodes;
generating a second key based on the received first key and generating a certificate for the at least one node; and
transmitting the generated certificate to the at least one node, wherein:
the first key is a key from a first authentication key chain comprising a plurality of keys generated by the at least one node for use in authenticating messages transmitted by the at least one node, the at least one node configured to generate a third authentication key chain comprising a plurality of keys and further configured to authenticate messages using at least two message authentication codes that are computed using a unique key from each of the first authentication key chain and the third authentication key chain, and
the certificate generated by the processor includes the second key and an identity of the at least one node.

13. The computer-readable storage medium of claim 12, wherein the program instructions are configured to cause the processor to perform operations further comprising:
generating the first authentication key chain by applying a one-way function to the received first key.

14. The computer-readable storage medium of claim 12, wherein the program instructions are configured to cause the processor to perform operations further comprising:
receiving a third key from the at least one node; and
generating a fourth key based on the received third key.

15. The computer-readable storage medium of claim 14, wherein the third key is a key from the third authentication key chain comprising a plurality of keys generated by the at least one node for use in authenticating messages transmitted by the at least one node.

16. The computer-readable storage medium of claim 14, wherein the second key is the anchor element in the first authentication key chain and the fourth key is the anchor element in the third authentication key chain.

17. The computer-readable storage medium of claim 14, wherein the certificate generated by the processor includes the fourth key.

18. A system comprising:
a central node;
a first node; and
a second node, wherein the central node is trusted by the first and second nodes, and wherein:
the central node generates and stores a first authentication key chain comprising a plurality of first keys,
the first node generates a second authentication key chain comprising a plurality of second keys and a third authentication key chain,
the plurality of first keys and the plurality of second keys overlap at least partially,
the first node authenticates a message sent to the second node using at least two message authentication codes, each of the at least two message authentication codes computed using a unique key from the second authentication key chain and the third authentication key chain, and
the central node broadcasts a key that is used by the second node to verify the message as coming from the first node.

19. The system of claim 18, wherein the central node generates a fourth authentication key chain comprising a plurality of fourth keys and randomly selects the broadcast key from the plurality of first keys and the plurality of fourth keys.

20. The system of claim 18, wherein the first node selects the broadcast key from the first authentication key chain.

* * * * *